United States Patent
Klingler

(10) Patent No.: US 8,111,795 B2
(45) Date of Patent: Feb. 7, 2012

(54) METHOD AND SYSTEM FOR A MULTI-CHANNEL SIGNAL SYNCHRONIZER

(75) Inventor: Keith L. Klingler, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 2252 days.

(21) Appl. No.: 10/955,061

(22) Filed: Sep. 30, 2004

(65) Prior Publication Data

US 2006/0050823 A1    Mar. 9, 2006

Related U.S. Application Data

(60) Provisional application No. 60/607,732, filed on Sep. 7, 2004.

(51) Int. Cl.
*H04L 7/00* (2006.01)
(52) U.S. Cl. ......... 375/355; 375/356; 375/357; 375/358
(58) Field of Classification Search .................. 375/354, 375/357, 362, 360, 370, 373, 377, 306, 307
See application file for complete search history.

(56) References Cited

U.S. PATENT DOCUMENTS

| | | | | |
|---|---|---|---|---|
| 3,708,783 A * | 1/1973 | Hedin | ............................ | 714/746 |
| 4,119,796 A * | 10/1978 | Jones | ............................ | 375/362 |
| 5,587,709 A * | 12/1996 | Jeong | ............................ | 341/100 |
| 5,699,389 A * | 12/1997 | Beladi et al. | ................. | 375/371 |
| 6,795,515 B1 * | 9/2004 | Riedle et al. | ................. | 375/355 |
| 7,016,441 B1 * | 3/2006 | Naoe | ............................ | 375/354 |
| 7,081,777 B2 * | 7/2006 | Huang et al. | ................... | 327/99 |
| 7,170,962 B2 * | 1/2007 | Joy et al. | ........................ | 375/371 |
| 2002/0080809 A1 * | 6/2002 | Nicholson et al. | ............ | 370/412 |
| 2002/0124030 A1 * | 9/2002 | Enam et al. | .................... | 708/102 |
| 2003/0005250 A1 * | 1/2003 | Johnson et al. | ............... | 711/167 |
| 2003/0031082 A1 * | 2/2003 | Sawada | ......................... | 365/233 |
| 2003/0031209 A1 * | 2/2003 | Regev et al. | .................. | 370/503 |
| 2003/0174798 A1 * | 9/2003 | Pickering et al. | ............... | 375/376 |
| 2005/0012539 A1 * | 1/2005 | Huang et al. | ................... | 327/407 |
| 2006/0002502 A1 * | 1/2006 | Abhayagunawardhana et al. | ............................. | 375/373 |
| 2006/0050819 A1 * | 3/2006 | Van Houdt et al. | ........... | 375/354 |
| 2007/0083786 A1 * | 4/2007 | Chiang | ........................ | 713/500 |

* cited by examiner

*Primary Examiner* — Chieh M Fan
*Assistant Examiner* — Qutbuddin Ghulamali
(74) *Attorney, Agent, or Firm* — McAndrews, Held & Malloy, Ltd.

(57) ABSTRACT

Certain aspects of a multi-channel signal synchronizer may comprise receiving a plurality of clock signals from a plurality of clock signal sources, wherein a portion of the received plurality of clock signals may be out of synchronization with a remaining portion of the received plurality of clock signals. A plurality of data signals may be received from a plurality of data signal sources, wherein a portion of the received plurality of data signals may be out of synchronization with a remaining portion of the received plurality of data signals. The received portion of plurality of clock signals and data signals may be synchronized to the received remaining portion of plurality of clock signals and data signals utilizing bit alignment and sample alignment. A plurality of synchronized output signals may be generated based on the synchronized received plurality of clock signals and synchronized received plurality of data signals.

30 Claims, 10 Drawing Sheets

METHOD AND SYSTEM FOR A MULTI-CHANNEL SIGNAL SYNCHRONIZER

CROSS-REFERENCE TO RELATED APPLICATIONS/INCORPORATION BY REFERENCE

This application makes reference to, claims priority to, and claims the benefit of U.S. Provisional Patent Application Ser. No. 60/607,732, filed on Sep. 9, 2004.

The above stated application is incorporated herein by reference in its entirety.

FIELD OF THE INVENTION

Certain embodiments of the invention relate to signal synchronizers. More specifically, certain embodiments of the invention relate to a method and system for a multi-channel signal synchronizer.

BACKGROUND OF THE INVENTION

An audio formatter is a logical device that produces audio output and may have several components, for example, a speech component and multiple sound components. Multi-channel signal formatters are usually based on a single clock. A single clock may not work for systems, in which the signal formatters have to operate independently as well as in-phase. One option to overcome this problem may be to utilize a set of signal formatters based on a single clock and additional signal formatters may be utilized to run on separate clocks. The resultant outputs may be multiplexed. One problem with this option is that at least two extra signal formatters are required for operating in a 6-channel mode and at least three signal formatters are required for operating in an 8-channel mode.

FIG. 1 is a block diagram of an exemplary conventional multi-channel signal formatter system. Referring to FIG. 1, the system comprises three serial signal formatters 102, 104 and 106 and three multiplexers 108, 110 and 112. Each of the serial signal formatters 102, 104 and 106 are coupled to a system clock (SYS_CLK). The serial signal formatters 102, 104 and 106 may be adapted to send out a request signal (REQUEST_A, REQUEST_B or REQUEST_C) to an audio device and may receive an acknowledge signal (VALID_A, VALID_B or VALID_C) from the audio device. The data signals (DATA_A, DATA_B or DATA_C) may be input to the serial signal formatters 102, 104 and 106 on the system clock (SYS_CLK) domain.

The serial signal formatters 102, 104 and 106 may output a synchronous signal (SYNC_A, SYNC_B or SYNC_C), a clock signal (SCLK_A, SCLK_B or SCLK_C) and a data signal (SDAT_A, SDAT_B or SDAT_C). The data signals (SDAT_A, SDAT_B or SDAT_C) that are output from the serial signal formatters 102, 104 and 106 may run on one of many possible signal clock domains, for example, a MCLK domain. The multiplexers 108, 110 and 112 may be adapted to multiplex several MCLK signals (MCLK_0 . . . MCLK_n) from different audio devices and output a MCLK signal (MCLK_A, MCLK_B or MCLK_C) to each of the serial signal formatters 102, 104 and 106 respectively. The delay through each MCLK signal multiplexer 108, 110 and 112 may be different and the MCLK signal is asynchronous with the system clock signal SYS_CLK. The three multiplexers 108, 110 and 112 may be adapted to select at least one MCLK signal to clock the three serial signal formatters 102, 104 and 106 respectively.

FIG. 2 is a timing diagram illustrating a common serial signal format that may be utilized in connection with the conventional multi-channel signal formatter system of FIG. 1, for example. Referring to FIG. 2, there is shown signals MCLK 202, SCLK 204, SYNC 206 and SDAT 208. The signal MCLK 202 may be a high frequency clock signal that may be synchronous with the serial signal formatter output clock signal SCLK 204, but with an arbitrary phase. The SYNC 206 signal may be asserted on the first falling edge of the SCLK 204 signal and may remain high until the end of one cycle of operation, for example, the left channel in a 2-channel mode. The SDAT 208 output signal may send out a word of data on the rising edge of SYNC 206 signal with its most significant bit (MSB) aligned to the rising edge of the SYNC 206 signal, for example, during the left channel cycle in a 2-channel mode. The next word may be sent out by the SDAT 208 signal on the falling edge of SYNC 206 signal with its most significant bit (MSB) aligned to the falling edge of SYNC 206 signal, for example, during the right channel cycle in a 2-channel mode.

In one mode of operation, each output serial signal formatter 102, 104 and 106 (FIG. 1) may work independently in a 2-channel mode, wherein each serial signal formatter 102, 104 and 106 may supply its own synchronization signal SYNC 206, clock signal SCLK 204, and data signal SDAT 208. Other common serial signal formats may delay SDAT 208 signal by a clock or may align SDAT 208 signal with the least significant bit (LSB). Some serial signal formats may be adapted to invert the polarities of SYNC 206 signal and/or SCLK 204 signal.

Another mode of operation is to have the outputs of the three serial signal formatters 102, 104 and 106 (FIG. 1) in phase working together in a 6-channel mode. The serial signal formatters B 104 and C 106 may supply data signals DATA_A and DATA_B respectively, but only the SYNC 206 signal and SCLK 204 signal from the serial signal formatter A 102 may be used. Such an output may look like FIG. 2 above, except the SDAT 208 signal may be a 3-bit bus rather than a single bit-bus. Each serial signal formatter 102, 104 or 106 may be adapted to operate in both 2-channel and 6-channel modes. The output signals of the serial signal formatters 102, 104 and 106 may be clocked by the MCLK 202 signal, while the system clock signal SYS_CLK may clock the input of serial signal formatters 102, 104 and 106. To ensure that the output signals are in phase, both bit-by-bit and sample-by-sample a method is needed.

FIG. 3 is a timing diagram illustrating a problem that may occur during bit alignment in the conventional multi-channel signal formatter system of FIG. 1, for example. Referring to FIG. 3, there is shown an ALIGN 302 signal, MCLK_A 304 signal, ALIGN_A 306 signal, MCLK_B 308 signal and ALIGN_B 310 signal. The ALIGN 302 signal is the output of a flip-flop with its input signal as the system clock SYS_CLK. The MCLK_A 304 and MCLK_B 308 signals may be the outputs of signal sources A and B respectively. The ALIGN_A 306 and ALIGN_B 310 signals may be utilized to initialize bit counters. To ensure proper phase alignment of output signals in 6-channel mode, an ALIGN 302 signal may be transferred from the system clock domain to the MCLK domain. The ALIGN 302 signal may be utilized to initialize bit counters in each of the serial signal formatters 102, 104 and 106, which in turn may be adapted to control when each bit may be output. Referring to FIG. 3, a problem is illustrated that may occur when the ALIGN 302 signal is clocked independently with each MCLK signal. The serial signal formatters A 102 and B 104 (FIG. 1) may select the same MCLK source, but there may be a slight difference in delay in the MCLK multiplexers 108, 110 and 112 that may cause ALIGN_A 306 signal to just catch the rising edge of MCLK_A 304 signal, while ALIGN_B 310 signal may miss the rising edge of MCLK_B 308 signal that occurs in the same clock cycle. This may result in ALIGN_A 306 signal and ALIGN_B 310 signal being offset by one MCLK period and the resulting SDAT 208 output signal may be offset by one clock period.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for a multi-channel signal synchronizer. Aspects of the method may comprise receiving a plurality of clock signals from a plurality of clock signal sources, wherein at least a portion of the received plurality of clock signals may be out of synchronization with at least a remaining portion of the received plurality of clock signals. A plurality of data signals may be received from a plurality of data signal sources, wherein at least a portion of the received plurality of data signals may be out of synchronization with at least a remaining portion of the received plurality of data signals. The received portion of plurality of clock signals may be synchronized to the received remaining portion of the plurality of clock signals utilizing bit alignment. The received portion of plurality of data signals may be synchronized to the received remaining portion of plurality of data signals utilizing bit alignment and sample alignment. A plurality of synchronized output signals may be generated based on the synchronized received plurality of clock signals and synchronized received plurality of data signals.

A check all valid signal may be generated that may occur between two consecutive request time signals. The check all valid signal may occur midway between two consecutive request time signals. A plurality of request signals may be generated that may request data from the plurality of data signal sources. A plurality of valid signals may also be generated that may acknowledge the generated plurality of request signals to at least one off chip or on chip device. At least a first signal may be generated by logical ANDing the plurality of valid signals and the check all valid signal. At least a second signal may be generated by logical ORing the first signal and at least an all valid signal detecting all valid signals. The all valid signal may be generated by utilizing the second signal and a system clock. A plurality of all valid signals may be generated by utilizing the all valid signal and the synchronized received plurality of clock signals and the generated plurality of all valid signals may utilize sample alignment. The generated plurality of synchronized output signals may further comprise a plurality of alignment signals that may be adapted to initialize a set of bit counters that may utilize bit alignment.

Another embodiment of the invention may provide a machine-readable storage, having stored thereon, a computer program having at least one code section executable by a machine, thereby causing the machine to perform the steps as described above for a multi-channel signal synchronizer.

In accordance with another embodiment of the invention, a system for processing signals may be provided. In this regard, the system may comprise circuitry for receiving a plurality of clock signals from a plurality of clock signal sources, wherein at least a portion of the received plurality of clock signals may be out of synchronization with at least a remaining portion of the received plurality of clock signals. Circuitry may be adapted for receiving a plurality of data signals from a plurality of data signal sources, wherein at least a portion of the received plurality of data signals may be out of synchronization with at least a remaining portion of the received plurality of data signals. The system may comprise circuitry that may be adapted to synchronize the received portion of the plurality of clock signals to the received remaining portion of the plurality of clock signals utilizing bit alignment. Circuitry may be adapted to synchronize the received portion of the plurality of data signals to the received remaining portion of the plurality of data signals utilizing bit alignment and sample alignment. The system may further comprise circuitry that may be adapted to generate a plurality of synchronized output signals based on the synchronized received plurality of clock signals and the synchronized received plurality of data signals.

Circuitry may be adapted to generate a check all valid signal that may occur between two consecutive request time signals. In one embodiment of the invention, the check all valid signal may occur midway between two consecutive request time signals. Notwithstanding, the system may comprise circuitry that may be adapted to generate a plurality of request signals that may request data from the plurality of data signal sources. Circuitry may be adapted to communicate a plurality of valid signals that may acknowledge the generated plurality of request signals to at least one off chip or on chip device. The system may further comprise circuitry that may be adapted to generate at least a first signal by logical ANDing the plurality of valid signals and a check all valid signal. Circuitry may be adapted to generate at least a second signal by logical ORing the first signal and an all valid signal. The system may comprise circuitry that may be adapted to generate the all valid signal and may utilize the second signal and a system clock. Circuitry may be adapted to generate a plurality of all valid signals utilizing the all valid signal and the synchronized received plurality of clock signals and the generated plurality of all valid signals may utilize sample alignment. The generated plurality of synchronized output signals may further comprise a plurality of alignment signals that may be adapted to initialize a set of bit counters that may utilize bit alignment.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a multi-channel signal synchronizer. Aspects of the method may comprise receiving a plurality of clock signals from a plurality of clock signal sources, wherein at least a portion of the received plurality of clock signals may be out of synchronization with at least a remaining portion of the received plurality of clock signals. A plurality of data signal sources may be adapted to receive a plurality of data signals, wherein at least a portion of the received plurality of data signals may be out of synchronization with at least a remaining portion of the received plurality of data signals. The received portion of plurality of clock signals may be synchronized to the received remaining portion of the plurality of clock signals utilizing bit alignment. The received portion of plurality of data signals may be synchronized to the received remaining portion of plurality of data signals utilizing bit alignment and sample alignment. A plurality of synchronized output signals may be generated based on the synchronized received plurality of clock signals and synchronized received plurality of data signals.

Figure 4:
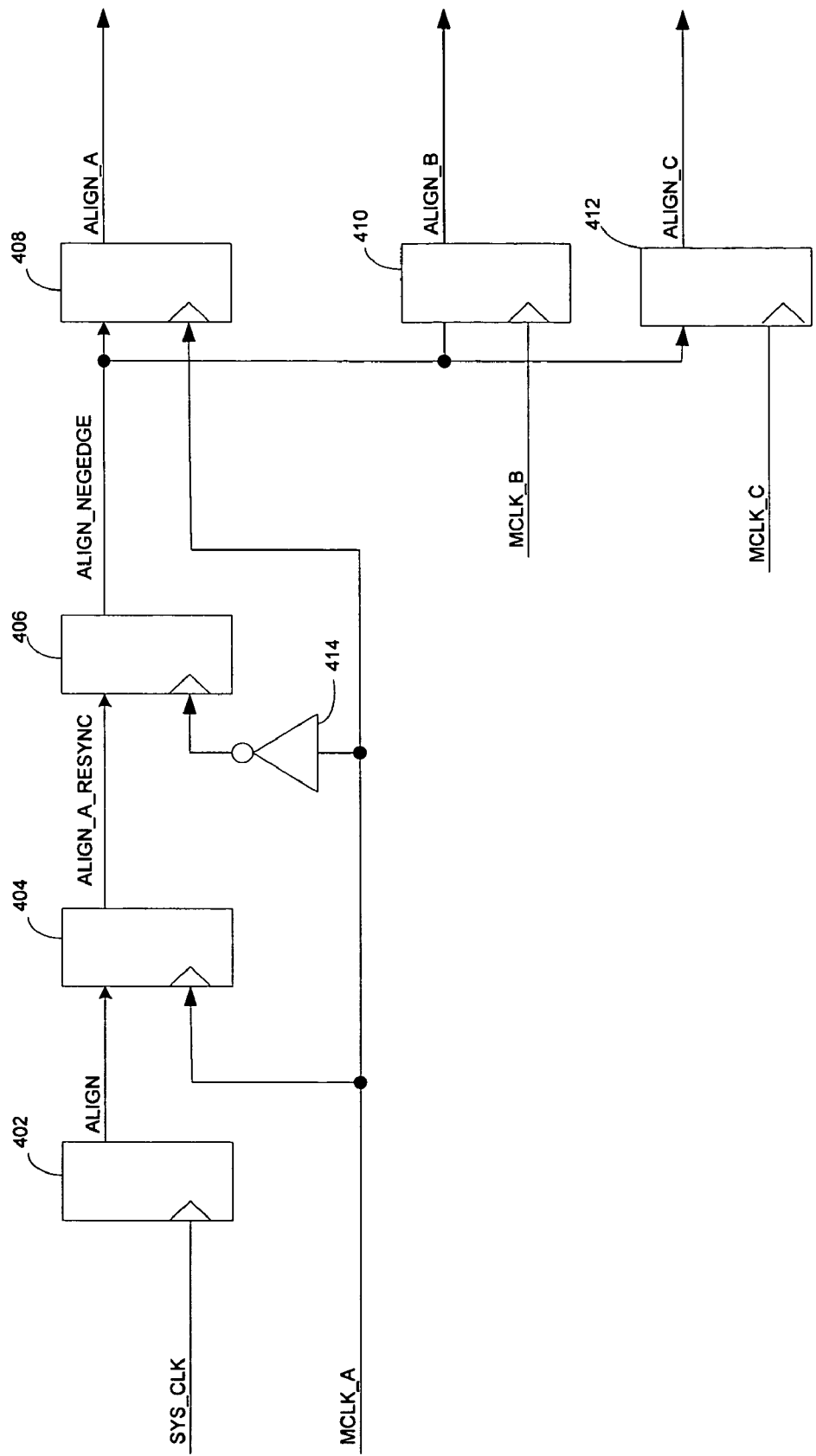
FIG. 4 is a block diagram of a multi-channel signal formatter system to transfer an ALIGN signal that may be utilized in connection with an embodiment of the invention.

FIG. 4 is a block diagram of a multi-channel signal formatter system that may be utilized to transfer an alignment signal ALIGN in accordance with an embodiment of the invention. Referring to FIG. 4, the system comprises flip-flops 402, 404, 406, 408, 410 and 412 and an inverter 414. Clock signals MCLK_A, MCLK_B and MCLK_C, may be the output clock signals of audio sources A 602, B 604 and C 606 (FIG. 6) respectively. Alignment signals ALIGN_A, ALIGN_B and ALIGN_C, may be the outputs of flip-flops 408, 410 and 412 respectively.

In operation, flip-flop 402 may be adapted to transfer a system clock signal SYS_CLK to an ALIGN signal that may be asserted. The flip-flop 404 may be adapted to receive an input alignment signal ALIGN from flip-flop 402 and the MCLK_A clock signal from a source such as an audio source and may output an alignment resynchronizing signal ALIGN_A_RESYNSC to flip-flop 406, which may be asserted on the rising edge of the clock signal MCLK_A. The flip-flop 406 may be adapted to receive the alignment resynchronizing signal ALIGN_A_RESYNC from flip-flop 404 and a negated clock signal MCLK_A after being negated by an inverter 414. The flip-flop 406 may output an alignment signal ALIGN_NEGEDGE to flip-flops 408, 410 and 412. The alignment signal ALIGN_NEGEDGE may be asserted on the falling edge of the clock signal MCLK_A. Flip-flops 408, 410 and 412 may each receive a clock signal MCLK_A, MCLK_B or MCLK_C and the alignment signal ALIGN_NEGEDGE, and may generate the alignment signals ALIGN_A, ALIGN_B and ALIGN_C, which may be utilized to initialize bit counters.

Figure 5:
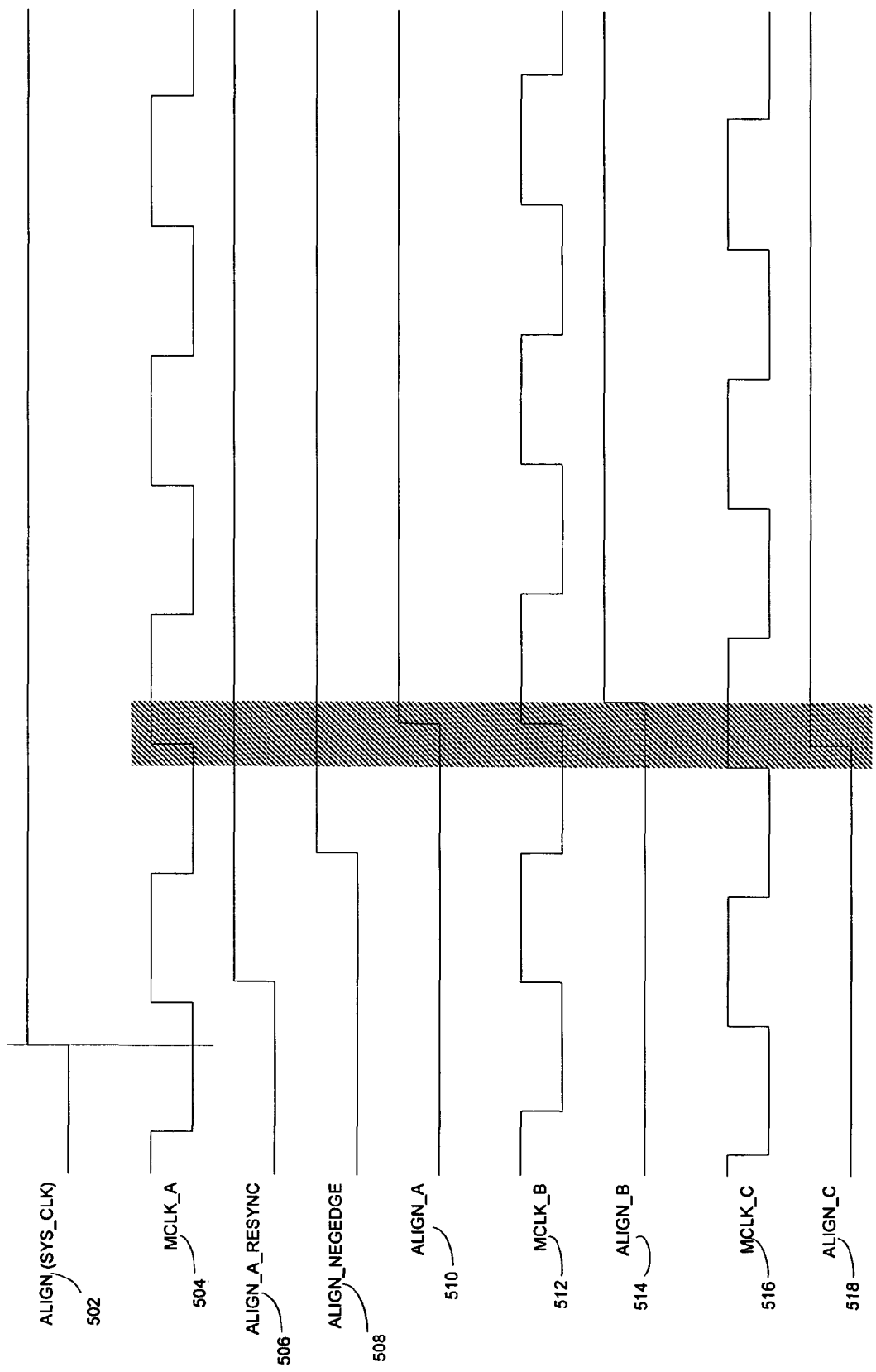
FIG. 5 is a timing diagram illustrating the operation of a multi-channel signal formatter system to transfer an alignment signal (ALIGN) in FIG. 4, for example, that may be utilized in connection with an embodiment of the invention.

FIG. 5 is a timing diagram illustrating the operation of a multi-channel signal formatter system to transfer an alignment signal ALIGN in FIG. 4, for example, in accordance with an embodiment of the invention. Referring to FIG. 5, there is shown an alignment signal ALIGN 502, clock signals MCLK_A 504, MCLK_B 512 and MCLK_C 516, an alignment resynchronizing signal ALIGN_A_RESYNC 506, an alignment signal ALIGN_NEGEDGE 508 and alignment signals ALIGN_A 510, ALIGN_B 514 and ALIGN_C 518.

Referring to FIG. 4, the flip-flop 402 may be coupled to the flip-flop 404 by an alignment signal ALIGN 502. The clock signal MCLK_A may be generated by a source such as an audio source. An alignment resynchronizing signal ALIGN_A_RESYNSC may couple flip-flop 404 and flip-flop 406 and may be asserted on a rising edge of the clock signal MCLK_A. The flip-flop 406 may be coupled to the flip-flops 408, 410 and 412 by an alignment signal ALIGN_NEGEDGE to flip-flops 408, 410 and 412. Flip-flops 408, 410 and 412 may each receive the clock signal MCLK_A and the alignment signal ALIGN_NEGEDGE, and may generate the alignment signals ALIGN_A, ALIGN_B and ALIGN_C, which may be utilized to initialize bit counters.

Figure 1:
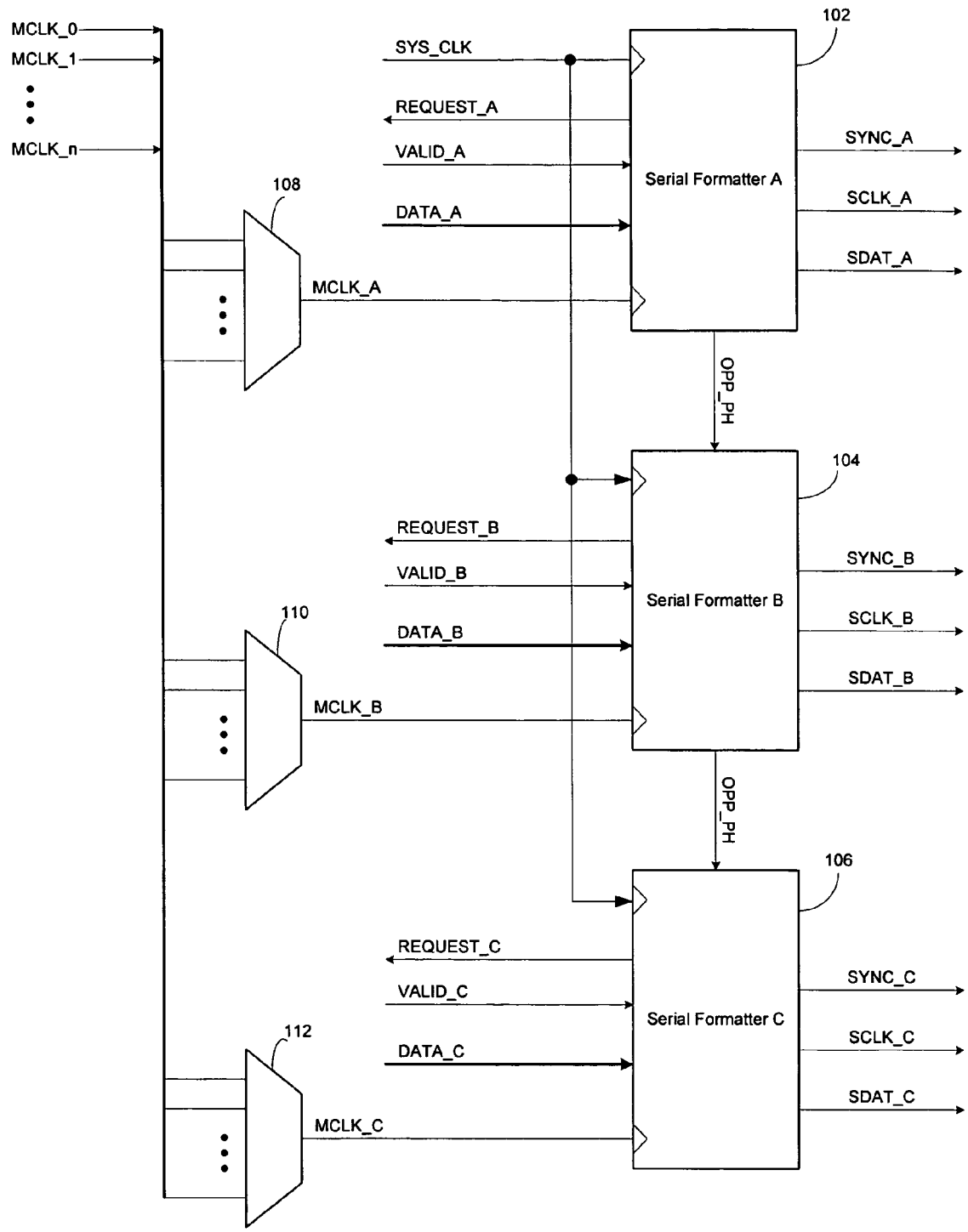
FIG. 1 is a block diagram of an exemplary multi-channel signal formatter system.
Figure 2:
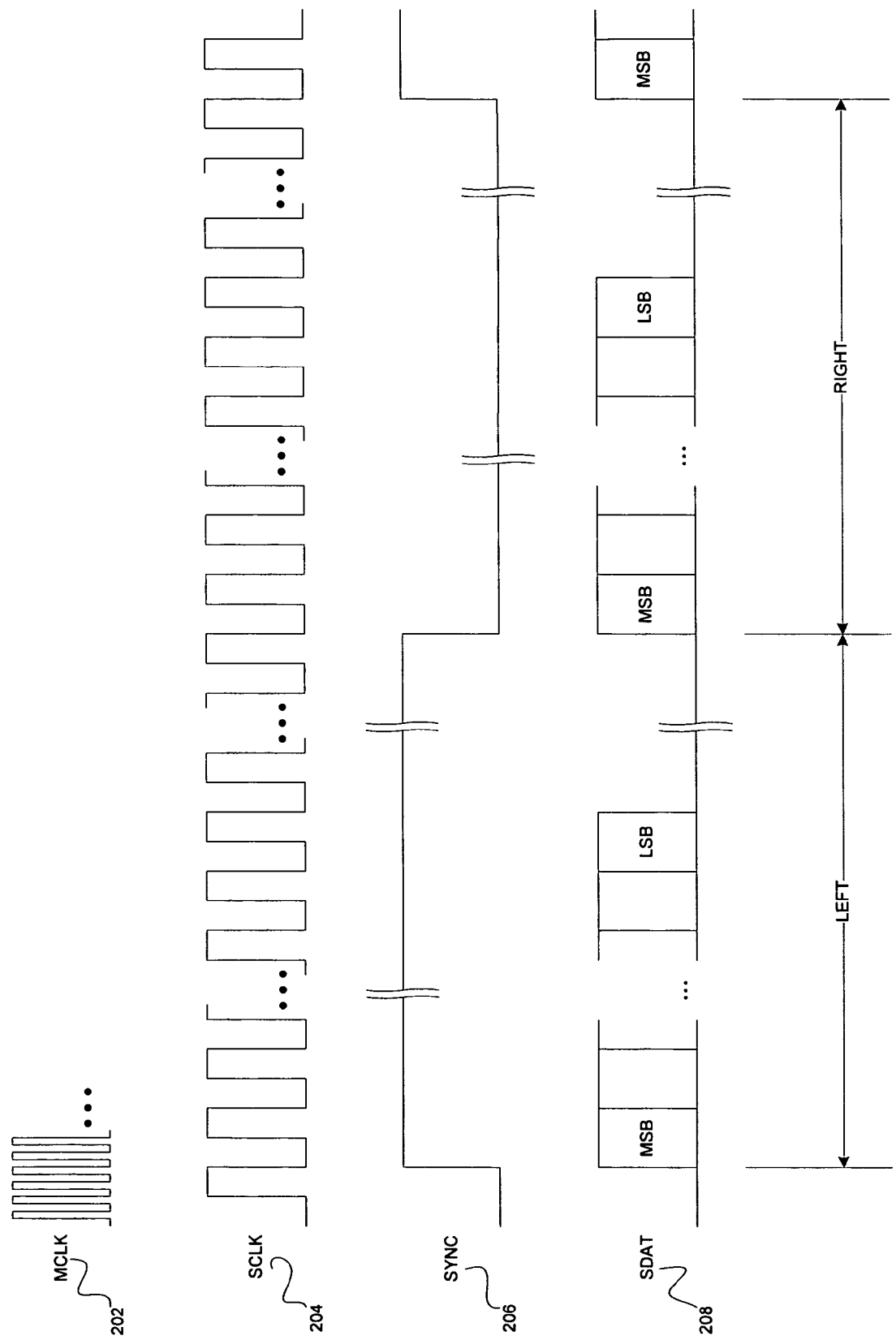
FIG. 2 is a timing diagram illustrating a common serial audio format that may be utilized in connection with the conventional multi-channel signal formatter system.
Figure 3:
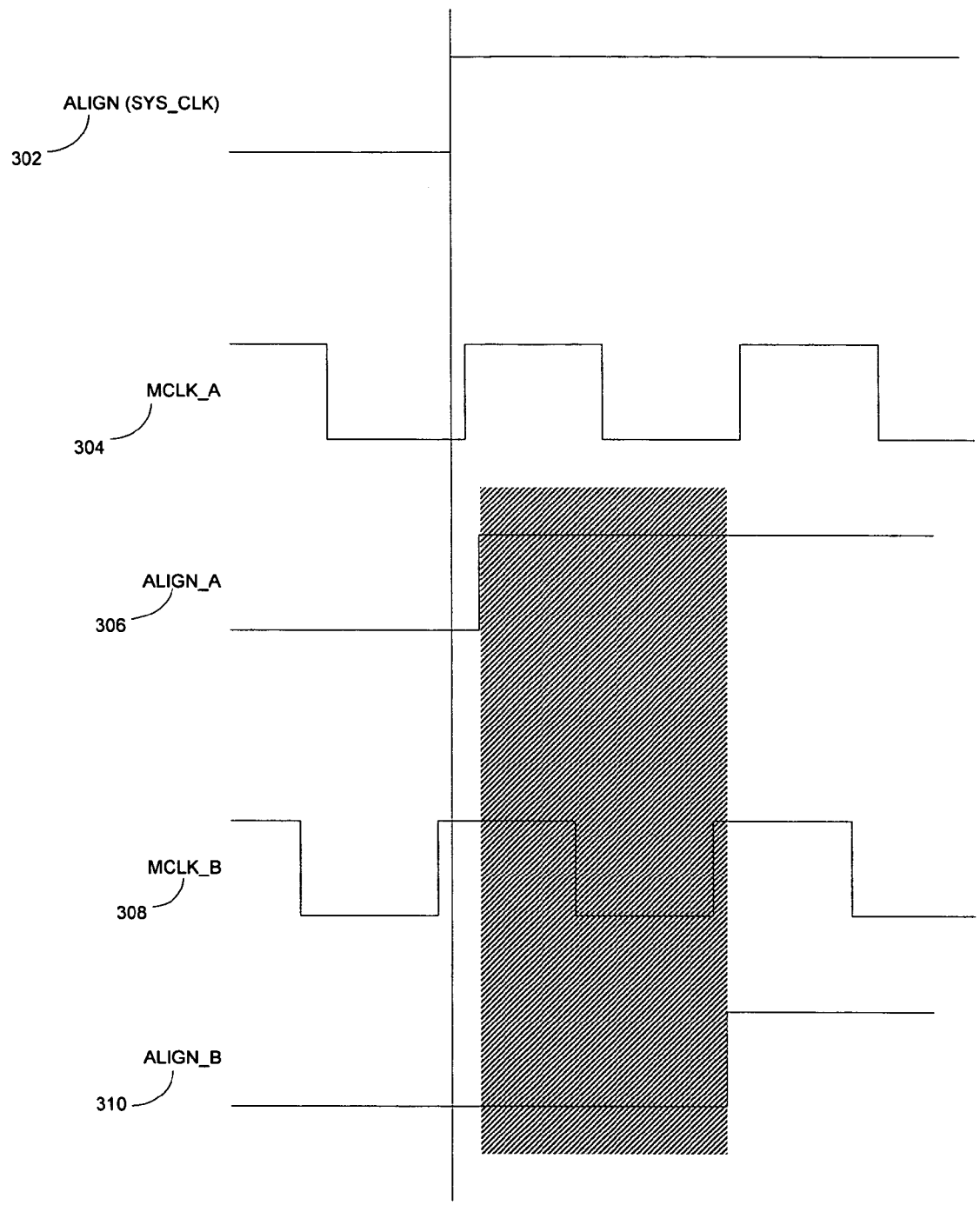
FIG. 3 is a timing diagram illustrating a problem that may occur during bit alignment in the conventional multi-channel signal formatter system.

The system clock signal SYS_CLK transforms to the alignment signal ALIGN 502 when asserted. The clock signals MCLK_A 504, MCLK_B 512 and MCLK_C 516 may be the output clocking signals from audio devices A 602, B 604 and C 606 (FIG. 6) respectively. The alignment resynchronizing signal ALIGN_A_RESYNC 506 may be asserted on the rising edge of the clock signal MCLK_A 504 while the alignment signal ALIGN_NEGEDGE 508 may be asserted on the falling edge of the clock signal MCLK_A 504. The edges of the alignment signals ALIGN_A 510, ALIGN_B 514 and ALIGN_C 518 may occur on the same MCLK source clock cycle, even though the clock signal MCLK_B 512 may lag the clock signal MCLK_A 504 and the clock signal MCLK_C 516 signal may lead the clock signal MCLK_A 504. The alignment signals ALIGN_A 510, ALIGN_B 514 and ALIGN_C 516 may differ by the variance in propagation delay through the MCLK multiplexers 108, 110 and 112 (FIG. 1) respectively. 6

Figure 6:
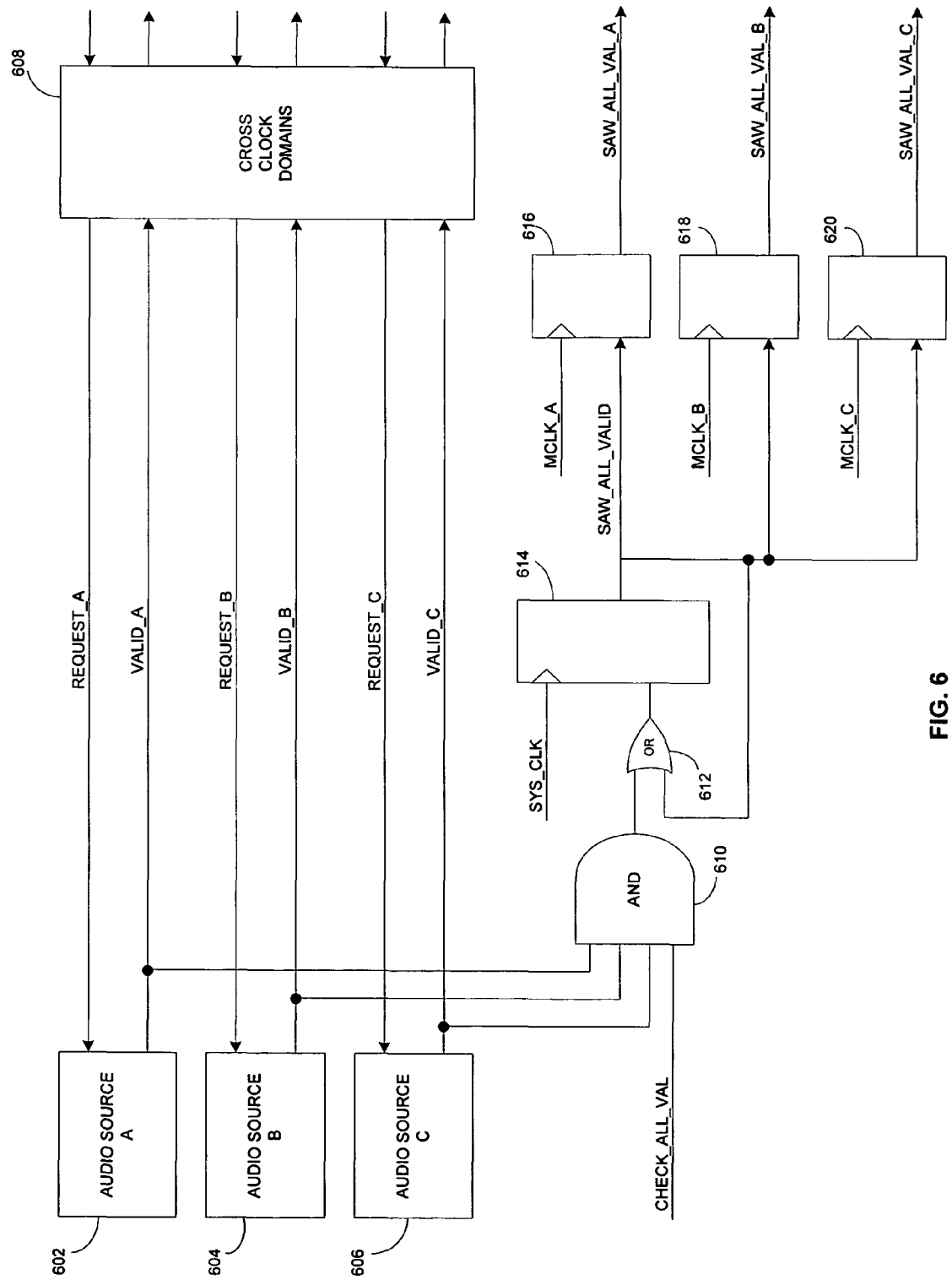
FIG. 6 is a block diagram of an exemplary multi-channel signal formatter system that may be utilized to maintain proper sample alignment in accordance with an embodiment of the invention.

FIG. 6 is a block diagram of an exemplary multi-channel signal formatter system that may be utilized to maintain proper sample alignment in accordance with an embodiment of the invention. Referring to FIG. 6, there is shown three audio sources A 602, B 604 and C 606, a cross clock domains block 608, an AND gate 610, an OR gate 612, and four flip-flops 614, 616, 618 and 620. A plurality of audio sources 602, 604 and 606 may each receive a request signal, namely REQUEST_A, REQUEST_B or REQUEST_C, from a serial signal formatter 102, 104 or 106 and may output a valid signal, namely VALID_A, VALID_B or VALID_C. The cross clock domains block 608 may be adapted to handle clock signals from one or more different clock domains, for example, the system clock SYS_CLK and MCLK domains.

The AND gate 610 may receive a plurality of signals as inputs and these may comprise the valid signals VALID_A, VALID_B or VALID_C from each of the audio sources A 602, B 604 and C 606 and a check all valid signal CHECK_ALL_VALID that may be asserted when it detects all the valid signals VALID_A, VALID_B or VALID_C are asserted. The OR gate 612 may be adapted to receive the output of the AND gate 610 and a feedback all valid signal SAW_ALL_VALID. The flip-flop 614 may be clocked by the system clock SYS_CLK and may be triggered by the output of the OR gate 612. The output of flip-flop 614 may be the all valid signal SAW_ALL_VALID, which may be utilized to trigger the three flip-flops 616, 618 and 620 in the MCLK domain. Each of the flip-flops 616, 618 and 620 may be clocked by clock signals MCLK_A, MCLK_B and MCLK_C respectively and may generate all valid signals SAW_ALL_VAL_A, SAW_ALL_VAL_B and SAW_ALL_VAL_C respectively.

In operation, even with the bits of each sample at the proper MCLK cycle as illustrated in FIG. 5, we may further need to ensure that the sample pairs in each of the three serial signal formatters 102, 104 and 106 (FIG. 1) are transmitted on the correct SYNC period. Data may be pulled from an upstream module, for example, an audio source A 602, by sending out a request signal REQUEST_A from a serial signal formatter to the audio source A 602. If the valid signal VALID_A is detected to be asserted on the same cycle that the request signal REQUEST_A is asserted, a serial signal formatter may be adapted to latch a sample. The upstream module, for example, audio source A 602 may then prepare another sample of data.

Figure 7:
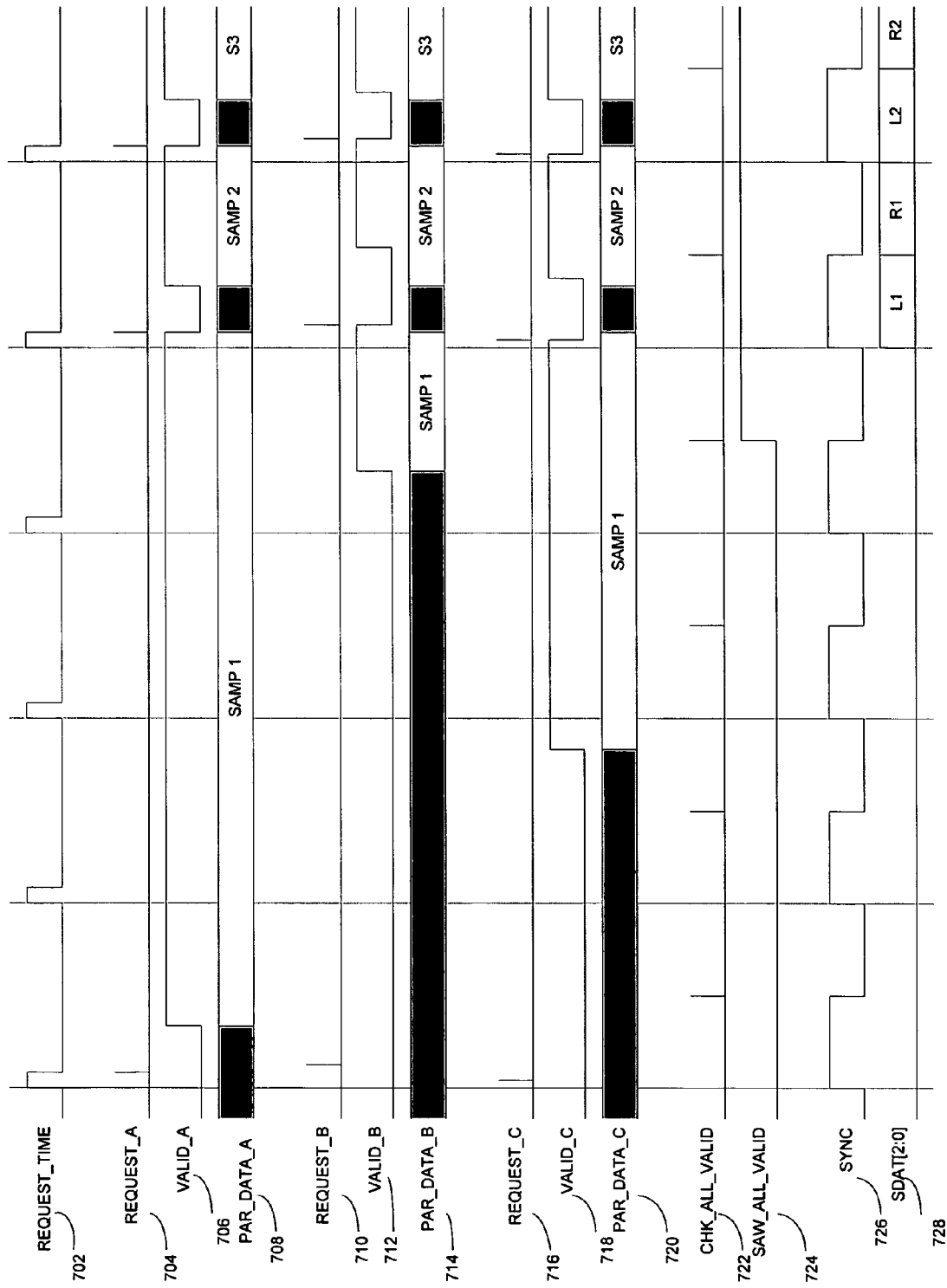
FIG. 7 is a timing diagram illustrating the operation of an exemplary multi-channel signal formatter system that may be utilized to maintain proper sample alignment in accordance with an embodiment of the invention.

FIG. 7 is a timing diagram illustrating the operation of an exemplary multi-channel signal formatter system that may be utilized to maintain proper sample alignment in accordance with an embodiment of the invention. Referring to FIG. 7, there is shown a request time signal REQUEST_TIME 702, request signals REQUEST_A 704, REQUEST_B 710 and REQUEST_C 716, valid signals VALID_A 706, VALID_B 712, and VALID_C 718, data buses PAR_DATA_A 708, PAR_DATA_B 714 and PAR_DATA_C 720, a check all valid signal CHK_ALL_VALID 722, an all valid signal SAW_ALL_VALID 724, a synchronizing signal SYNC 726 and a data bus SDAT 728.

The request time signal REQUEST_TIME 702 may be a short pulse that may be sent out once every sample period. The request signals REQUEST_A 704, REQUEST_B 710 and REQUEST_C 716 may be sent out once to request a first sample of data, and then wait until all streams have valid data signals, where the valid signals VALID_A 706, VALID_B 712 and VALID_C 718 are asserted. The request signals, REQUEST_A 704, REQUEST_B 710 and REQUEST_C 716 may be generated on the same MCLK clock cycle for each serial signal formatter to ensure bit alignment. The data may be transmitted or received by the data buses PAR_DATA_A 708, PAR_DATA_B 714 and PAR_DATA_C 718. The check all valid signal CHK_ALL_VALID 722 may occur midway between consecutive request time signals REQUEST_TIME 702. The all valid signal SAW_ALL_VALID 724 may be asserted when all the valid signals VALID_A 706, VALID_B 712 and VALID_C 718 are asserted and the check all valid signal CHK_ALL_VALID 722 is asserted. The synchronizing signal SYNC 726 may be asserted and deasserted once during a cycle of operation for each channel of operation respectively. The data bus SDAT 728 may output a word of data on the rising edge of the synchronizing signal SYNC 726, for example, during the left channel cycle in a 2-channel mode. The next word of data may be output by the data bus SDAT 728 on the falling edge of the synchronizing signal SYNC 726, for example, during the right channel cycle in a multi-channel mode, for example, a 2-channel mode.

In operation, there may be an uncertainty regarding when the request signals may be transferred from the MCLK domain to the system clock SYS_CLK domain. This uncertainty may allow the request signals REQUEST_A 704, REQUEST_B 710 and REQUEST_C 716 received by the upstream module to not necessarily occur on the same system clock SYS_CLK cycle. Each serial signal formatter 102, 104 and 106 (FIG. 1) may not be adapted to individually check that all valid signals VALID_A, VALID_B and VALID_C are asserted because of the uncertainty of transferring the valid signals VALID_A 706, VALID_B 712 and VALID_C 718 back to each MCLK clock domain. An aspect of the invention overcomes the prior art of FIG. 1 in an instance where serial signal formatters A and B 102 and 104 (FIG. 1) respectively may just catch valid signals VALID_A 706 and VALID_B 712, but serial signal formatter C 106 may just miss the current valid signal VALID_C 718. The samples from serial signal formatter C 106 may be delayed by one sample relative to serial signal formatters A 102 and B 104.

The serial signal formatter A 102 may be adapted to become a master formatter and may generate a pulse halfway between request time signals REQUEST_TIME 702. This pulse may be transferred from the MCLK domain to the system clock SYS_CLK domain, where it may become a check all valid signal CHK_ALL_VALID 722 signal. The first time that all valid signals VALID_A 706, VALID_B 712 and VALID_C 718 are asserted and the check all valid signal CHK_ALL_VALID 722 is asserted, the all valid signal SAW_ALL_VALID 724 may be asserted. The all valid signal SAW_ALL_VALID 724 signal may be checked individually by each of the serial signal formatter in their respective MCLK clock domains at each period of the request time signal REQUEST_TIME 702. The all valid signal SAW_ALL_VALID 724 may be asserted away from the request time signal REQUEST_TIME 702 to allow for the uncertainty of many clock periods. After the first sample pairs are aligned, the serial signal formatters 102, 104 and 106 may request and receive data as if they were operating independently in a 2-channel mode. By using the above illustrated bit alignment and sample alignment techniques, a plurality of independent 2-channel serial signal formatters may be used to implement a multi-channel mode, for example, a 6-channel mode with precise phase control. This concept may further be extended to 8 or more channels by utilizing similar techniques. The various embodiments of the invention may also apply to any output formatter, whether audio or not, that may need to independently select its clock but operate in phase with other output formatters.

Figure 8:
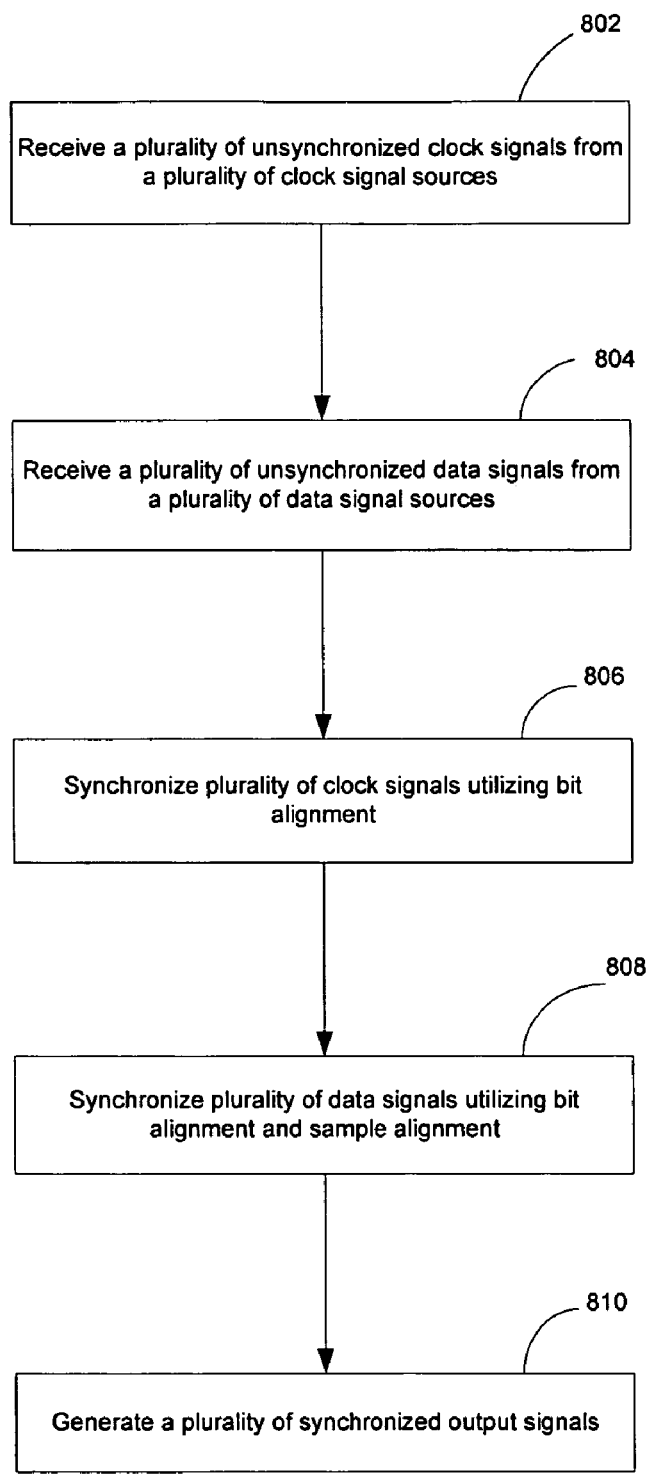
FIG. 8 is a flowchart illustrating the operation of an exemplary multi-channel signal formatter system in accordance with an embodiment of the invention.

FIG. 8 is a flowchart illustrating the operation of an exemplary multi-channel signal formatter system in accordance with an embodiment of the invention. Referring to FIG. 8, in step 802, a plurality of clock signals may be received from a plurality of clock signal sources, wherein at least a portion of the received plurality of clock signals may be out of synchronization with at least a remaining portion of the received plurality of clock signals. In step 804, a plurality of data signal sources may be received from a plurality of data signal sources, wherein at least a portion of the received plurality of data signals may be out of synchronization with at least a remaining portion of the received plurality of data signals. In step 806, the received portion of plurality of clock signals may be synchronized to the received remaining portion of the plurality of clock signals utilizing bit alignment. In step 808, the received portion of plurality of data signals may be synchronized to the received remaining portion of plurality of data signals utilizing bit alignment and sample alignment. In step 810, a plurality of synchronized output signals may be generated based on the synchronized received plurality of clock signals and synchronized received plurality of data signals.

Figure 9:
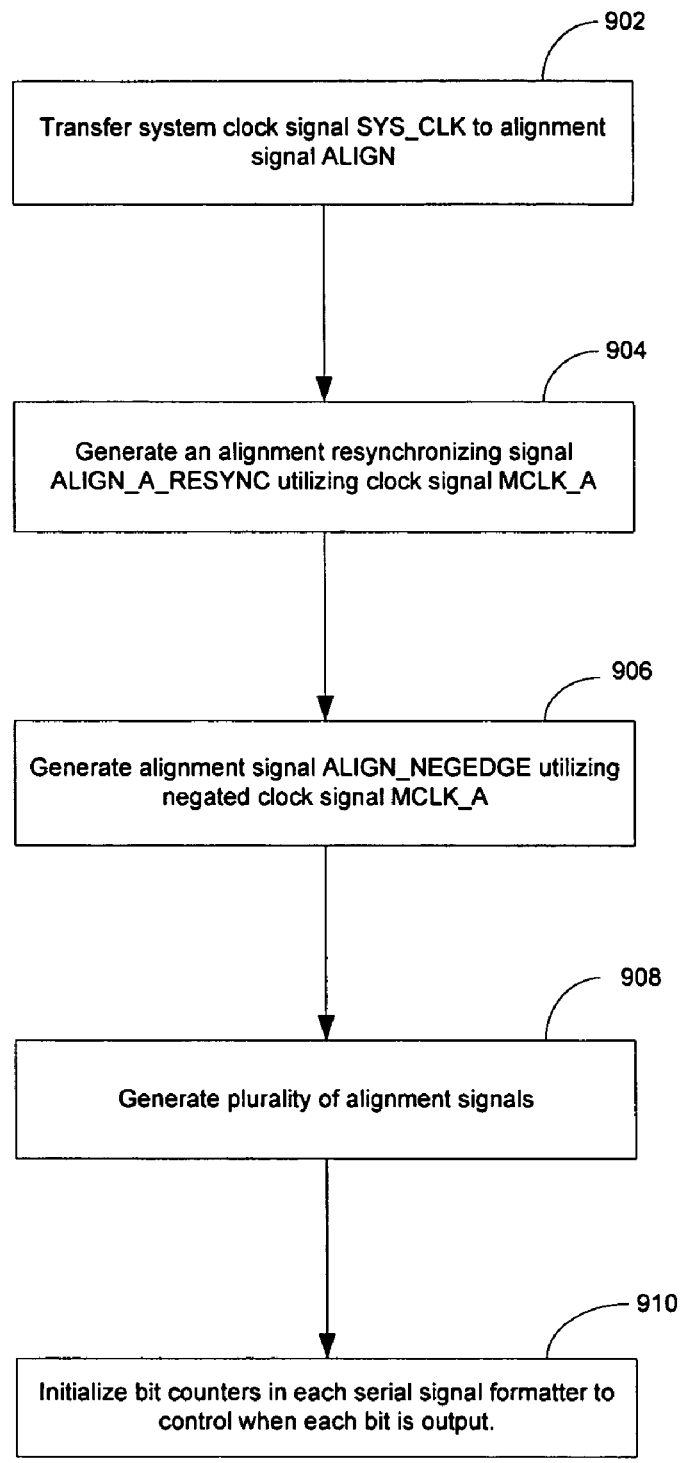
FIG. 9 is a flowchart illustrating bit alignment in an exemplary multi-channel signal formatter system in accordance with an embodiment of the invention.

FIG. 9 is a flowchart illustrating bit alignment in an exemplary multi-channel signal formatter system in accordance with an embodiment of the invention. Referring to FIG. 9, in step 902, a system clock signal SYS_CLK may be transferred to an alignment signal ALIGN. In step 904, an alignment resynchronizing signal ALIGN_A_RESYNC may be generated utilizing the alignment signal ALIGN and a master clock signal MCLK_A. In step 906, an alignment signal ALIGN_NEGEDGE may be generated utilizing the alignment resynchronizing signal ALIGN_A_RESYNC and a negated master clock signal MCLK_A. In step 908, a plurality of alignment signals may be generated utilizing the alignment signal ALIGN_NEGEDE and a plurality of clock signals. In step 910, bit counters in each serial signal formatter may be initialized to control when each bit is output to ensure bit alignment.

Figure 10:
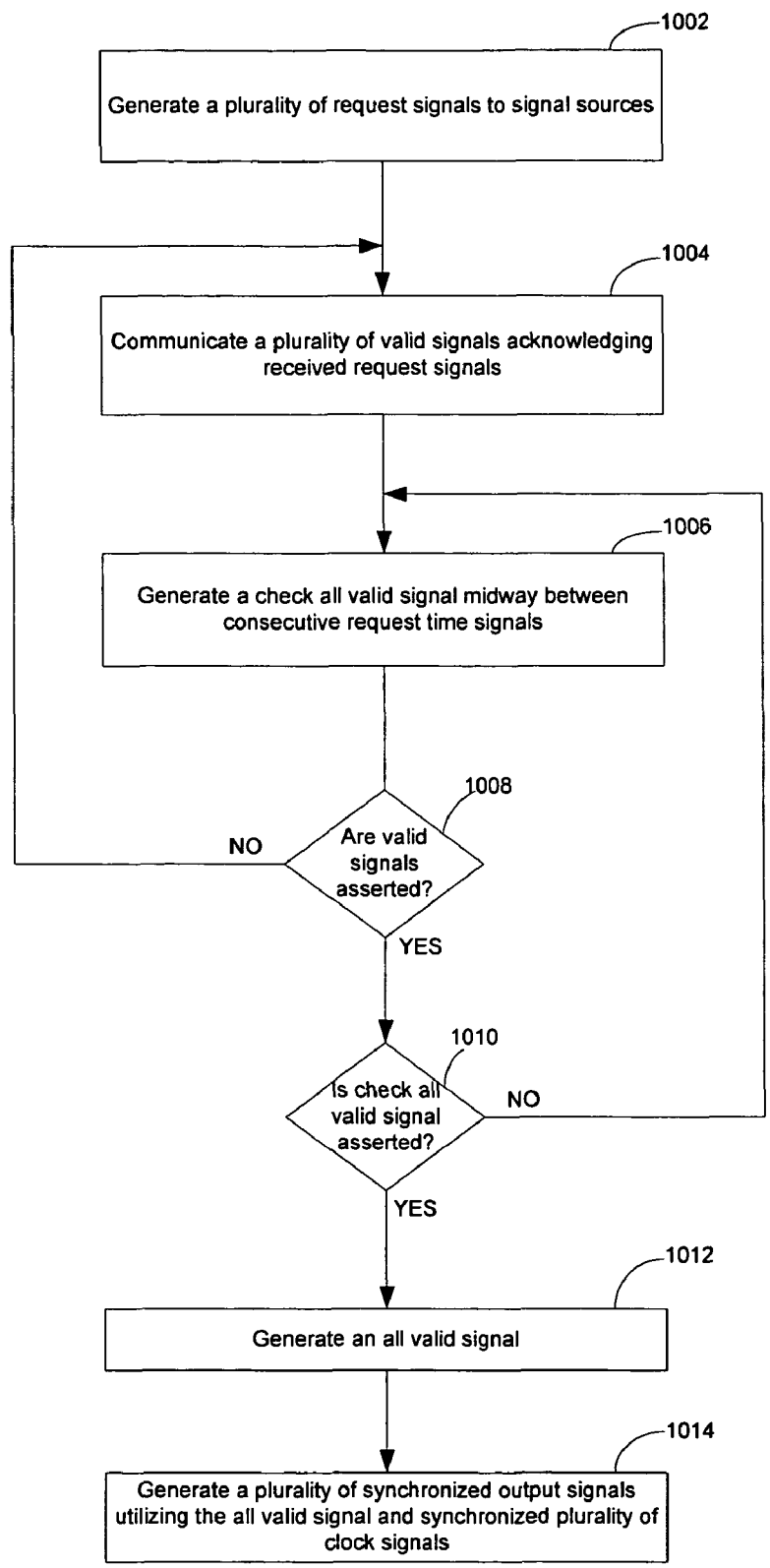
FIG. 10 is a flowchart illustrating sample alignment in an exemplary multi-channel signal formatter system in accordance with an embodiment of the invention.

FIG. 10 is a flowchart illustrating sample alignment in an exemplary multi-channel signal formatter system in accordance with an embodiment of the invention. Referring to FIG. 10, in step 1002, a plurality of request signals may be generated that may request data from the plurality of data signal sources. In step 1004, a plurality of valid signals may be generated that may acknowledge the generated plurality of request signals to at least one off chip or on chip device. In step 1006, a check all valid signal may be generated that may occur midway between two consecutive request time signals. In step 1008, valid signals may be checked to detect if they are asserted. If any of the valid signals are deasserted, control passes to step 1004, else if the valid signals are asserted control passes to step 1010. In step 1010, the check all valid signal may be checked to detect if it is asserted. If the check all valid signal is not asserted, control passes to step 1006, else control passes to step 1012. In step 1012, an all valid signal may be generated utilizing a system clock. In step 1014, a plurality of synchronized output signals may be generated utilizing the all valid signal and a synchronized plurality of clock signals utilizing sample alignment.

In accordance with an embodiment of the invention, a system for processing signals may be provided. In this regard, the system may comprise serial signal formatters to receive a plurality of clock signals from a plurality of clock signal sources 602, 604 and 606 (FIG. 6), wherein at least a portion of the received plurality of clock signals may be out of synchronization with at least a remaining portion of the received plurality of clock signals. For example, clock signals MCLK_A and MCLK_B may be out of synchronization with clock signal MCLK_C. The serial signal formatters may be adapted to receive a plurality of data signals (DATA_A, DATA_B and DATA_C) from a plurality of data signal sources 602, 604 and 606 respectively, wherein at least a portion of the received plurality of data signals may be out of synchronization with at least a remaining portion of the received plurality of data signals. For example, data signals DATA_A and DATA_B may be out of synchronization with data signal DATA_C.

The system may comprise circuitry that may be adapted to synchronize clock signals MCLK_A and MCLK_B to the clock signal MCLK_C utilizing bit alignment. The synchronization circuitry may be adapted to synchronize the data signals DATA_A and DATA_B with data signal DATA_C utilizing bit alignment and sample alignment. A plurality of synchronized output signals (SYNC, SCLK and SDAT) may be based on the synchronized received plurality of clock signals, for example, MCLK_A, MCLK_B and MCLK_C and the synchronized received plurality of data signals, for example, DATA_A, DATA_B and DATA_C.

A check all valid signal CHK_ALL_VALID may be generated, which may occur between two consecutive request time signals REQUEST_TIME. For example, the check all valid signal CHK_ALL_VALID may be generated so that it occurs midway between two consecutive request time signals REQUEST_TIME. The system may comprise circuitry that may be adapted to generate a plurality of request signals, REQUEST_A, REQUEST_B and REQUEST_C that may request data from the plurality of data signal sources 602, 604 and 606 respectively. The plurality of data signal sources 602, 604 and 606 may be adapted to communicate a plurality of valid signals, VALID_A, VALID_B and VALID_C to serial signal formatters that may acknowledge the generated plurality of request signals, REQUEST_A, REQUEST_B and REQUEST_C respectively. The system may further comprise circuitry that may be adapted to logical ANDing the plurality of valid signals, VALID_A, VALID_B and VALID_C and a check all valid signal CHK_ALL_VALID. Circuitry may be adapted to logical ORing the output of the AND gate 610 and an all valid signal SAW_ALL_VALID. The system may comprise circuitry that may be adapted to generate the all valid signal SAW_ALL_VALID and may utilize the output of the OR gate 612 and a system clock signal SYS_CLK. Circuitry may be adapted to generate a plurality of all valid signals, SAW_ALL_VAL_A, SAW_ALL_VAL_B and SAW_ALL_VAL_C utilizing the all valid signal SAW_ALL_VALID and the synchronized received plurality of clock signals MCLK_A, MCLK_B and MCLK_C. The generated plurality of all valid signals SAW_ALL_VAL_A, SAW_ALL_VAL_B and SAW_ALL_VAL_C may utilize sample alignment. The generated plurality of synchronized output signals (SYNC, SCLK and SDAT) may further comprise a plurality of alignment signals ALIGN_A, ALIGN_B and ALIGN_C that may be adapted to initialize a set of bit counters, which are utilized for bit alignment.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals, the method comprising:
   receiving a plurality of clock signals from a plurality of audio sources, wherein at least a portion of said received plurality of clock signals are out of synchronization with at least a remaining portion of said received plurality of clock signals;
   receiving a plurality of data signals from said plurality of audio sources, wherein at least a portion of said received plurality of data signals are out of synchronization with at least a remaining portion of said received plurality of data signals;
   synchronizing said received portion of said plurality of clock signals to said received remaining portion of said plurality of clock signals, based on initializing a set of bit counters;
   synchronizing said received portion of said plurality of data signals to said received remaining portion of said plurality of data signals utilizing bit alignment and sample alignment; and
   generating a plurality of synchronized output signals based on said synchronized received plurality of clock signals and said synchronized received plurality of data signals, wherein said generated plurality of synchronized output signals comprises a plurality of alignment signals that initialize said set of bit counters utilizing said bit alignment.

2. The method according to claim 1, comprising generating a check all valid signal that occurs between two consecutive request time signals.

3. The method according to claim 1 comprising generating a check all valid signal that occurs midway between two consecutive request time signals.

4. The method according to claim 1, comprising generating a plurality of request signals that requests data from said plurality of audio sources.

5. The method according to claim 4, comprising communicating a plurality of valid signals that acknowledges said generated plurality of request signals to at least one off chip or on chip device.

6. The method according to claim 5, comprising generating at least a first signal by logical ANDing said plurality of valid signals and a check all valid signal.

7. The method according to claim 6, comprising generating at least a second signal by logical ORing said first signal and an all valid signal.

8. The method according to claim 7, comprising generating said all valid signal utilizing said second signal and a system clock.

9. The method according to claim 8, comprising generating a plurality of all valid signals utilizing said all valid signal and said synchronized received plurality of clock signals.

10. The method according to claim 9, wherein said generated plurality of all valid signals utilizes said sample alignment.

11. A non-transitory computer readable medium having stored thereon, a computer program having at least one code section for processing signals the at least one code section being executable by a machine for causing the machine to perform steps comprising:
    receiving a plurality of clock signals from a plurality of audio sources, wherein at least a portion of said received plurality of clock signals are out of synchronization with at least a remaining portion of said received plurality of clock signals;
    receiving a plurality of data signals from said plurality of audio sources, wherein at least a portion of said received plurality of data signals are out of synchronization with at least a remaining portion of said received plurality of data signals;
    synchronizing said received portion of said plurality of clock signals to said received remaining portion of said plurality of clock signals, based on initializing a set of bit counters;
    synchronizing said received portion of said plurality of data signals to said received remaining portion of said plurality of data signals utilizing bit alignment and sample alignment; and
    generating a plurality of synchronized output signals based on said synchronized received plurality of clock signals and said synchronized received plurality of data signals, wherein said generated plurality of synchronized output signals comprises a plurality of alignment signals that initialize said set of bit counters utilizing said bit alignment.

12. The non-transitory computer readable medium according to claim 11, wherein said at least one code section comprises code for generating a check all valid signal that occurs between two consecutive request time signals.

13. The non-transitory computer readable medium according to claim 11, wherein said at least one code section comprises code for generating a check all valid signal that occurs midway between two consecutive request time signals.

14. The non-transitory computer readable medium according to claim 11, wherein said at least one code section comprises code for generating a plurality of request signals that requests data from said plurality of audio sources.

15. The non-transitory computer readable medium according to claim 14, wherein said at least one code section comprises code for communicating a plurality of valid signals that acknowledges said generated plurality of request signals to at least one off chip or on chip device.

16. The non-transitory computer readable medium according to claim 15, wherein said at least one code section comprises code for generating at least a first signal by logical ANDing said plurality of valid signals and a check all valid signal.

17. The non-transitory computer readable medium according to claim 16, wherein said at least one code section comprises code for generating at least a second signal by logical ORing said first signal and an all valid signal.

18. The non-transitory computer readable medium according to claim 17, wherein said at least one code section comprises code for generating said all valid signal utilizing said second signal and a system clock.

19. The non-transitory computer readable medium according to claim 18, wherein said at least one code section comprises code for generating a plurality of all valid signals utilizing said all valid signal and said synchronized received plurality of clock signals.

20. The non-transitory computer readable medium according to claim 19, wherein said generated plurality of all valid signals utilizes said sample alignment.

21. A system for processing signals, the system comprising:
    one or more circuits that are operable to receive a plurality of clock signals from a plurality of audio sources, wherein at least a portion of said received plurality of clock signals are out of synchronization with at least a remaining portion of said received plurality of clock signals;

said one or more circuits are operable to receive a plurality of data signals from said plurality of audio sources, wherein at least a portion of said received plurality of data signals are out of synchronization with at least a remaining portion of said received plurality of data signals;

said one or more circuits are operable to synchronize said received portion of said plurality of clock signals to said received remaining portion of said plurality of clock signals, based on initializing a set of bit counters;

said one or more circuits are operable to synchronize said received portion of said plurality of data signals to said received remaining portion of said plurality of data signals utilizing bit alignment and sample alignment; and said one or more circuits are operable to generate a plurality of synchronized output signals based on said synchronized received plurality of clock signals and said synchronized received plurality of data signals, wherein said generated plurality of synchronized output signals comprises a plurality of alignment signals that initialize said set of bit counters utilizing said bit alignment.

22. The system according to claim 21, wherein said one or more circuits are operable to generate a check all valid signal that occurs between two consecutive request time signals.

23. The system according to claim 21, wherein said one or more circuits are operable to generate a check all valid signal that occurs midway between two consecutive request time signals.

24. The system according to claim 21, wherein said one or more circuits are operable to generate a plurality of request signals that requests data from said plurality of audio sources.

25. The system according to claim 24, wherein said one or more circuits are operable to communicate a plurality of valid signals that acknowledges said generated plurality of request signals to at least one off chip or on chip device.

26. The system according to claim 25, wherein said one or more circuits are operable to generate at least a first signal by logical ANDing said plurality of valid signals and a check all valid signal.

27. The system according to claim 26, wherein said one or more circuits are operable to generate at least a second signal by logical ORing said first signal and an all valid signal.

28. The system according to claim 27, wherein said one or more circuits are operable to generate said all valid signal utilizing said second signal and a system clock.

29. The system according to claim 28, wherein said one or more circuits are operable to generate a plurality of all valid signals utilizing said all valid signal and said synchronized received plurality of clock signals.

30. The system according to claim 29, wherein said generated plurality of all valid signals utilizes said sample alignment.

* * * * *